United States Patent
Xiong et al.

(10) Patent No.: US 7,548,637 B2
(45) Date of Patent: Jun. 16, 2009

(54) METHOD FOR DETECTING OBJECTS IN AN IMAGE USING PAIR-WISE PIXEL DISCRIMINATIVE FEATURES

(75) Inventors: Ziyou Xiong, West Hartford, CT (US); Thomas S. Huang, Urbana, IL (US); Makoto Yoshida, Shizoka (JP)

(73) Assignee: The Board of Trustees of the University of Illinois, Urbana, IL (US)

( * ) Notice: Subject to any disclaimer, the term of this patent is extended or adjusted under 35 U.S.C. 154(b) by 815 days.

(21) Appl. No.: 11/101,376

(22) Filed: Apr. 7, 2005

(65) Prior Publication Data
US 2006/0228026 A1  Oct. 12, 2006

(51) Int. Cl.
G06K 9/00 (2006.01)
(52) U.S. Cl. .......................... 382/118; 902/3; 340/5.83
(58) Field of Classification Search .............. 382/100, 382/115, 116, 117, 118, 123, 124, 125, 181, 382/190, 195, 194, 155, 156, 159; 351/204; 235/380; 902/3–6; 340/5.1–5.92
See application file for complete search history.

(56) References Cited

U.S. PATENT DOCUMENTS

| | | | |
|---|---|---|---|
| 6,128,397 A | 10/2000 | Baluja et al. ............... 382/118 |
| 6,911,933 B1* | 6/2005 | Mutz et al. ................ 342/25 B |
| 6,952,178 B2* | 10/2005 | Kirscht ..................... 342/25 B |
| 2003/0053663 A1* | 3/2003 | Chen et al. .................. 382/117 |
| 2003/0108244 A1 | 6/2003 | Li et al. ...................... 382/227 |
| 2004/0022442 A1 | 2/2004 | Kim ........................... 382/225 |
| 2005/0129275 A1* | 6/2005 | Porter et al. ................ 382/103 |

FOREIGN PATENT DOCUMENTS

WO  WO2004/051552  6/2004

OTHER PUBLICATIONS

G. Yang and T. S. Huang, "Human Face Detection in Complex Background," Pattern Recognition, vol. 27, No. 1, pp. 53-63, 1994.
T.K. Leung, M.C. Burl, and P. Perona, "Finding Faces in Cluttered Scenes Using Random Labeled Graph Matching," Proc. Fifth IEEE Int'l Conf. Computer Vision, pp. 637-644, 1995.
J. Yang and A. Waibel, "A Real-Time Face Tracker," Proc. Third Workshop Applications of Computer Vision, pp. 142-147, 1996.
K.C. Yow and R. Cipolla, "Feature-Based Human Face Detection," Image and Vision Computing, vol. 15, No. 9, pp. 713-735, 1997.

(Continued)

Primary Examiner—Anand Bhatnagar
(74) Attorney, Agent, or Firm—Greer, Burns & Crain, Ltd.

(57) ABSTRACT

A method for detecting an object in an image includes calculating a log L likelihood of pairs of pixels at select positions in the image that are derived from training images. The calculated log L likelihood of the pairs of pixels is compared with a threshold value. The object is detected when the calculated log L likelihood is greater than the threshold value.

17 Claims, 7 Drawing Sheets

OTHER PUBLICATIONS

I. Craw, D. Tock, and A. Bennett, "Finding Face Features," Proc. Second European Conf. Computer Vision, pp. 92-96, 1992.

M. Turk and A. Pentland, "Eigenfaces for Recognition," J. Cognitive Neuroscience, vol. 3, No. 1, pp. 71-86, 1991.

E. Osuna, R. Freund, and F. Girosi, "Training Support Vector Machines: An Application to Face Detection," Proc. IEEE Conf. Computer Vision and Pattern Recognition, pp. 130-136, 1997.

H. Rowley, S. Baluja, and T. Kanade, "Neural Network-Based Face Detection," IEEE Trans. Pattern Analysis and Machine Intelligence, vol. 20, No. 1, pp. 23-38, Jan. 1998.

M.H. Yang, D. J. Kriegman and N. Ahuja, Detecting faces in images: a survey, Pattern Analysis and Machine Intelligence, IEEE Transactions on , vol. 24, Issue: 1, Jan. 2002, pp. 34-58.

A. J. Colmenarez and T. S. Huang, Face detection with information-based maximum discrimination, Computer Vision and Pattern Recognition, 1997. Proceedings., 1997 IEEE Computer Society Conference on, Jun. 17-19, 1997, pp. 782-787.

P. Viola and M. Jones, Rapid object detection using a boosted cascade of simple features, Computer Vision and Pattern Recognition, 2001. CVPR 2001. Proceedings of the 2001 IEEE Computer Society Conference on, vol. 1, Dec. 8-14, 2001, pp. I-511-I-518 vol. 1.

T. Sakai, M. Nagao and T. Kanade, Computer analysis and classification of photographs of human faces, Proc. $1^{st}$ USA-Japan Computer Conference, pp. 55-62(1972).

\* cited by examiner

METHOD FOR DETECTING OBJECTS IN AN IMAGE USING PAIR-WISE PIXEL DISCRIMINATIVE FEATURES

FIELD OF THE INVENTION

Fields of the invention include pattern recognition and image analysis. The invention concerns other more particular fields, including but not limited to, object detection in images using pair-wise pixel discriminative features.

BACKGROUND OF THE INVENTION

Object detection, specifically face detection, is currently used, for example, in Biometrics and facial identification solutions in law enforcement, airports, and customs and immigration, driver's license, passport and other government agencies. The goal of face detection is to identify all image regions which contain a face regardless of its three-dimensional position, orientation, and lighting conditions. Such a goal is challenging because faces are non-rigid and have a high degree of variability in size, shape, color and texture.

The problem associated, in particular, with frontal, upright human face detection by computers has existed for more than 30 years. Known methods of facial detection are summarized into four major groups. Knowledge-based methods are rule-based methods that encode human knowledge of what constitutes a typical face. Usually, the rules capture the relationships between facial features. One example of a knowledge-based method is described in G. Yang and T. S. Huang, "Human Face Detection in Complex Background," Pattern Recognition, vol. 27, no. 1, pp, 53-63, 1994.

Feature invariant approaches use algorithms to find structural features that exist even when the pose, viewpoint, or lighting conditions vary, and then use these to locate faces. Examples of these approaches can be found in T. K. Leung, M. C. Burl, and P. Perona, "Finding Faces in Cluttered Scenes Using Random Labeled Graph Matching," Proc. Fifth IEEE Int'l Conf. Computer Vision, pp. 637-644, 1995; and J. Yang and A Waibel, "A Real-Time Face Tracker," Proc. Third Workshop Applications of Computer Vision, pp. 142-147, 1996.

In template matching methods, several standard patterns of a face are stored to describe the face as a whole or the facial features separately. The correlations between an input image and the stored patterns are computed for detection. Examples of these methods are in K. C. Yow and R. Cipolla, "Feature-Based Human Face Detection," Image and Vision Computing~vol. 15, no. 9, pp. 713-735, 1997; and I. Craw, D. Tock and A. Bennett, "Finding Face Features," Proc. Second European Conf. Computer Vision, pp. 92-96, 1992.

In appearance based methods, in contrast to template matching, the models (or templates) are learned from a set of training images which capture the representative variability facial. These learned models are then used for detection. Examples of these methods include M. Turk and A. Pentland, "Eigenfaces for Recognition," J. Cognitive Neuroscience, vol. 3, no. 1, pp. 71-86, 1991; and A. J. Colmenarez and T. S. Huang, "Face detection with information-based maximum discrimination," Computer Vision and Pattern Recognition, 1997 Proceedings, 1997 IEEE Computer Society Conference on, 17-19 June 1997, Pages 782-787.

SUMMARY OF THE INVENTION

The present invention concerns a method for detecting an object in an image such as a face. The method includes calculating a log L likelihood of pairs of pixels at select positions in the image that are derived from training images, and comparing calculated log L likelihood of the pairs of pixels with a threshold value. The object is detected when the calculated log L likelihood is greater than the threshold value.

DETAILED DESCRIPTION OF THE PREFERRED EMBODIMENTS

Embodiments of the present invention are directed to object detection systems and methods for detecting faces in images and video. The present invention implements an appearance-based method in which models are learned from a set of training images that capture the representative variability of facial appearances. This involves learning a probabilistic face model and a probabilistic non-face model from a set of training face and non-face images, respectively. In accordance with one embodiment of the present invention, a pool of pair-wise pixel discriminative features is introduced, and an algorithm combines the top N pair-wise pixel discriminative features. The algorithm detects the presence and location of faces in images at multiple times the rate of known methods. The algorithm may be coded in C/C++, and may be added as a module in face recognition software.

Figure 1:
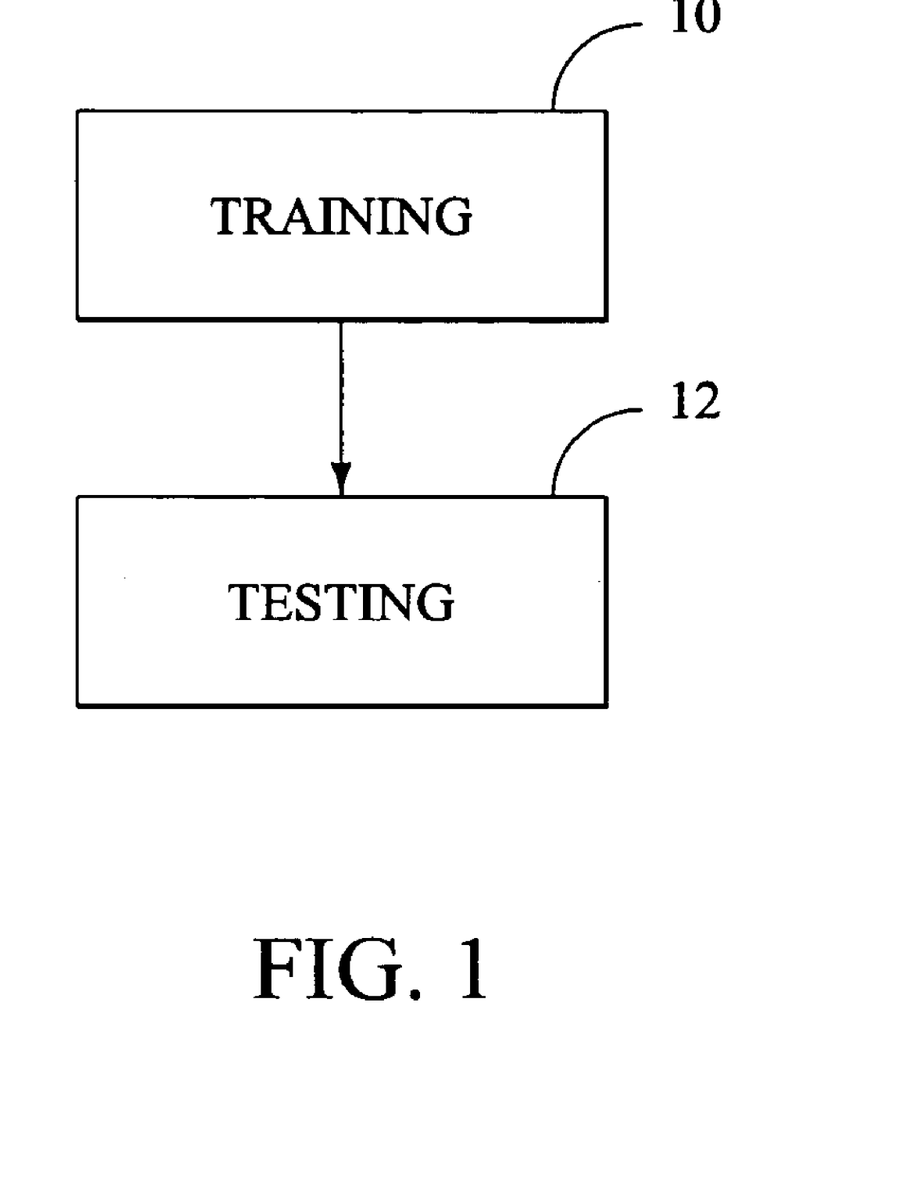
FIG. 1 illustrates the stages included in an object detection process in accordance with one embodiment of the present invention.

Turning now to FIG. 1, and in accordance with one embodiment of the present invention, an object detecting method is grouped into two stages, a training stage 10 and a testing stage 12. As described in more detail below, the training stage 10 includes creating conditional pair-wise distributions in the form of histograms of various locations on face images given an intensity value at another location on the face images, and histograms of the same pairs of locations on a collection of non-face images. From these histograms, the best N pairs of pixels corresponding to the best conditional relative entropy and associated histograms are selected and used to test for a face given an image in the testing stage 12.

Figure 2:
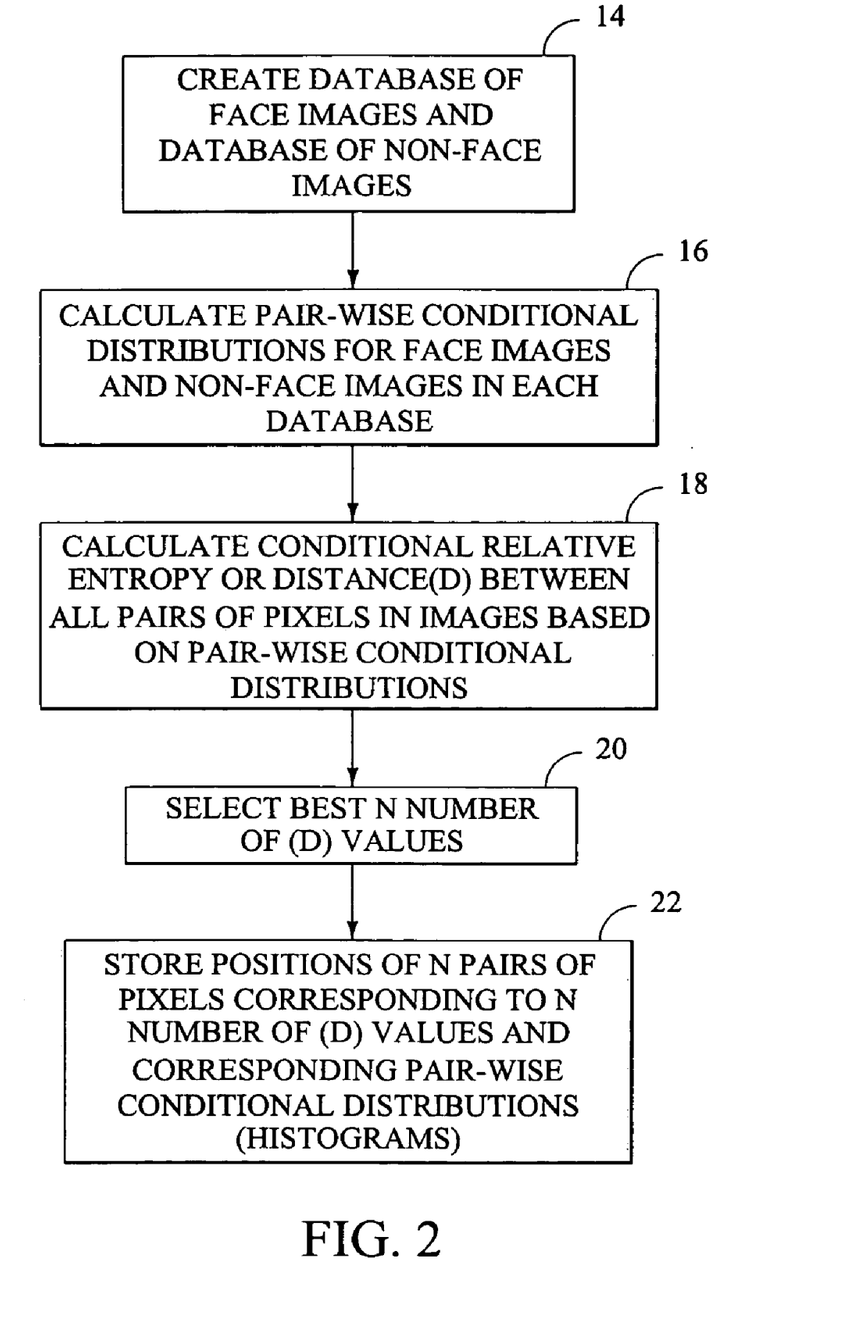
FIG. 2 is a flowchart of the process included in a training stage of the face detection process in accordance with one embodiment of the present invention.

FIG. 2 provides a more detailed description of the training stage 10. Initially, the training stage 10 includes creating a database of a plurality of training or face images, which may include hundreds of images, and a database for the same number of training non-face images (block 14). Then pair-wise conditional distributions in the form of histograms made of each pixel value given a pixel value of another location for every face image and non-face image in the databases are calculated (block 16).

Figure 3:
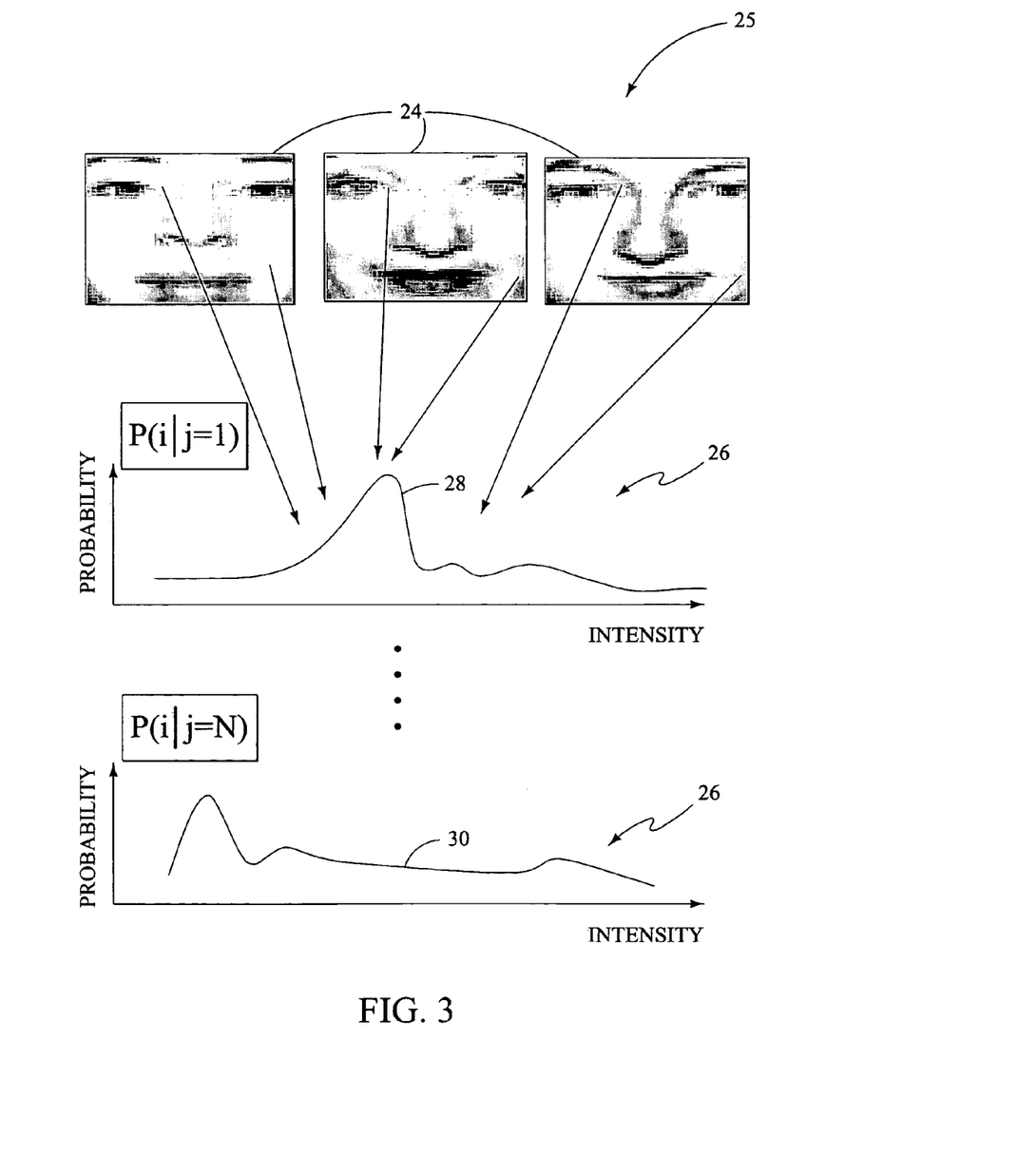
FIG. 3 shows histograms made up of a pixel value at a specific position given the pixel values at other locations, for face images.
Figure 4:
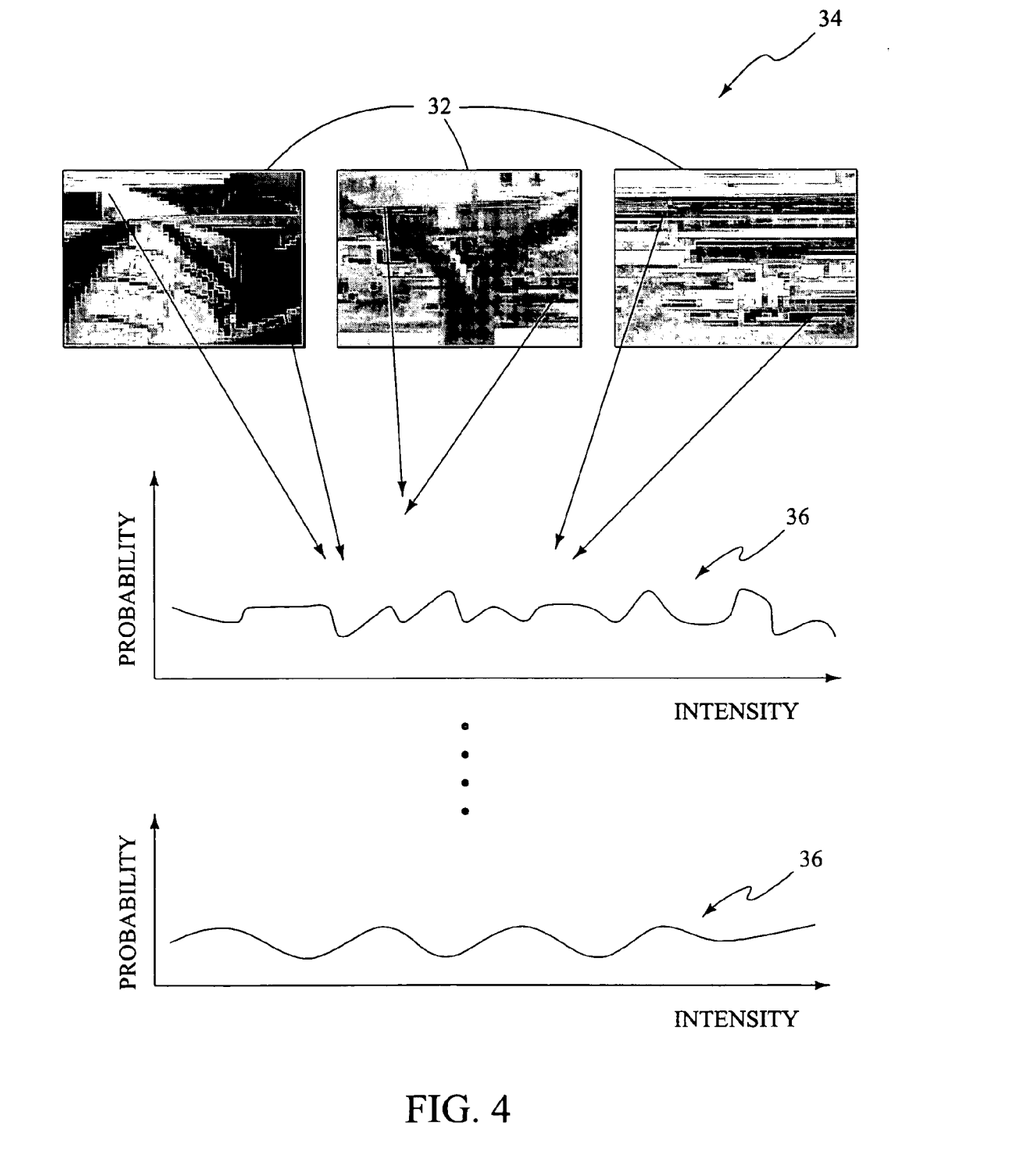
FIG. 4 shows histograms made up of the same pair of pixel values as in FIG. 3 for non-face images.

FIGS. 3 and 4 illustrate the manner in which these pair-wise conditional distributions or histograms are created. FIG. 3 shows three training face images 24 from a database 25 which have been cropped to the same size, 16×14 pixels, for example. The images are also aligned approximately at the outer corners of the eyes so that they are at substantially the same location in every face image 24. While only three images are shown in FIG. 3, all the images in the database 25 are prepared in the same manner. Moreover, the term, pixels, as used in this specification refers to any point on the training face images 24 or training non-face images. While the size of the image used in one embodiment is 16×14 pixels, other sizes may be also used, such as 16×16, 20×20, 24×24, for example.

The graphs 26 are histograms, where the x-axis is the intensity of a pixel and the y-axis represents the conditional probability of the intensity. Curves 28, 30 in the graphs 26 represent a collection of the conditional probabilities and intensities of a second pixel i on all the face images 24 given the intensity of a first pixel j on the same face images. The graphs 26 represent histograms of all the training face images 24 in the database 25 when the intensity of pixel j=1 to j=N (graph 26 with a curve 30 represents the histogram of pixel i when the pixel j is equal to N). The value of N in one example is 4. However, other arbitrary values of N may also be used. More information, i.e., additional histograms, from the training face image 24 may be obtained from selecting a larger N value, but this will require longer calculation time and more storage area. Histograms of all combinations of pixels i and j are collected for any desired number of training face images 24 in the database 25.

Turning now to FIG. 4, a number of training non-face images 32 in a database 34 are cropped to the same size as the face images 24 in the database 25, i.e., 16×14. The number of training non-face images 32 used may be approximately similar to the number used for face images 24, or it may be much greater than that of face images 24. The combinations of the same pairs of points used for the training face images 24, as well as the intensity values, i.e., j=1 through j=N, are also used to calculate the histograms 36 of training non-face image 32.

Referring back to FIG. 2, using the histograms 26, 36 for the training face images 24, and the non-face images 32, the conditional relative entropy or distance (D) between any two pixels in the 16×14 image is obtained (block 18). In one embodiment, the conditional relative entropy is a Kullback-Leibler distance $$D(P_F(i|j) \| P_N(i|j)) = \sum_{I(i)=1}^{M} P_F(j) \sum_{I(j)=1}^{M} P_F(i|j) \log \frac{P_F(i|j)}{P_N(i|j)} \quad (1)$$

where, D: distance; P: probability; F: Face class; N: Non-Face class; i, j: position index; I(i), I(j): pixel intensity at position i, j; M: the number of different intensity values a pixel can take. D(i,j) is non-negative and D(i,j)=0 if and only if the two conditional probabilities functions are the same. Other conditional relative entropy such as Jeffrey's divergence may also be used.

Figure 5:
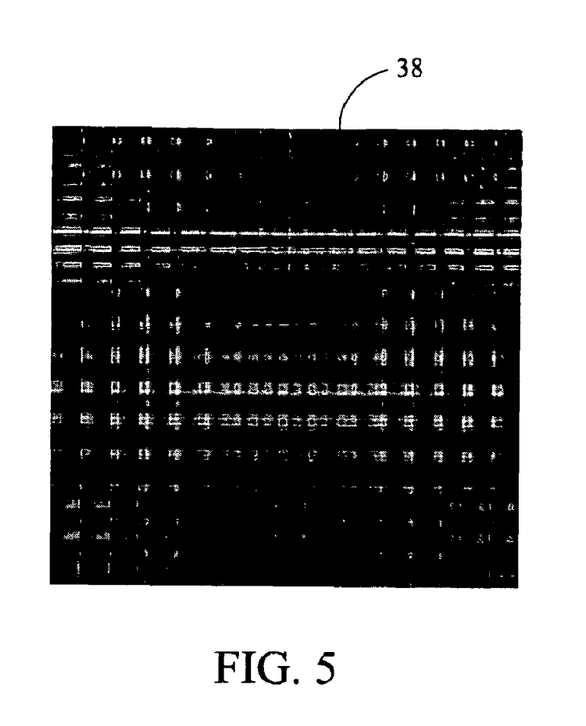
FIG. 5 is an image representing the conditional relative entropy between any two pixels in the face and non-face images used in creating the histograms shown in FIGS. 3 and 4.

A distance image 38 representing the result of solving for distance D for all pixel combinations for a 16×14 image is shown in FIG. 5. Every point on the distance image 38 represents a D value for a pair of pixels. The D value is larger in the whiter region. Then every row of D is transformed into a 16×14 block (or box) (since each row has 224 D's) to form an image 40 in FIG. 6. The image 40 has 16×14 of 16×14 blocks (or boxes) transformed from each row of the image in FIG. 5. In other words, FIG. 6 has 14 rows of 16×14 blocks and 16 columns of 16×14. Each rows in the image 38 make up 1 row of 16×14 blocks in the image 40.

Figure 6:
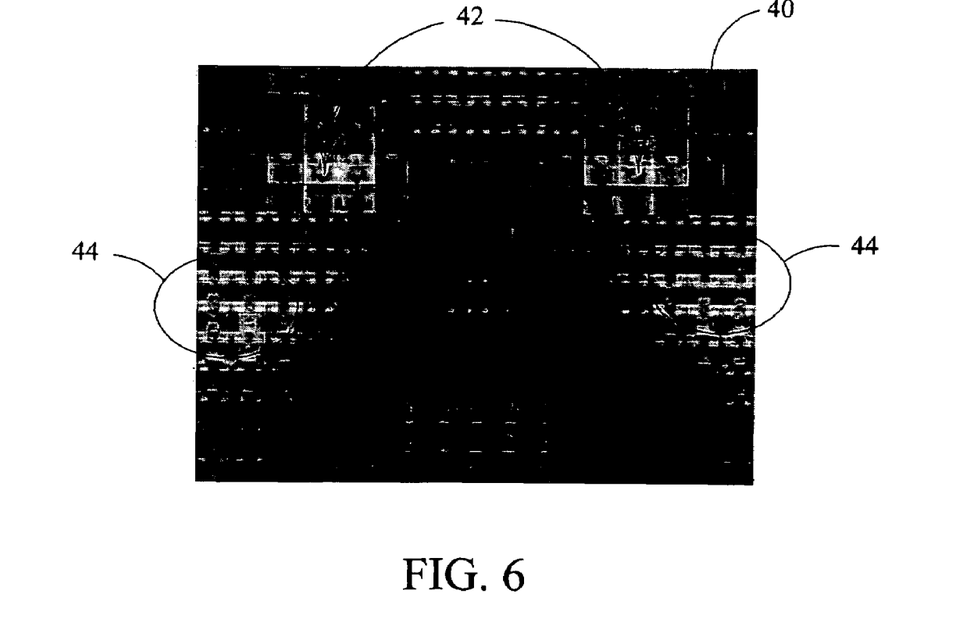
FIG. 6 is an image derived from the image of FIG. 5, in which each row of FIG. 5 is transformed into the same size and dimensions as the face and non-face images.

The image 40 approximates a face where the two areas 42 represent the eye region and the two areas 44 represent the cheek region. Since the larger D values reside in the eye and the cheek regions as shown in FIG. 6, the top or best N largest D values are selected from these regions to form a collection of good discriminating pixel pairs (block 20). How large the N values should be depends on the requirement on the trade-off between the detection rate and false alarm rate. The top distance (D) values and the corresponding N pairs of pixels, i.e., the positions of the N pairs, together with the pair-wise conditional distributions or histograms from the face images and non-face images are stored (block 22) to be used in the testing stage.

Figure 7:
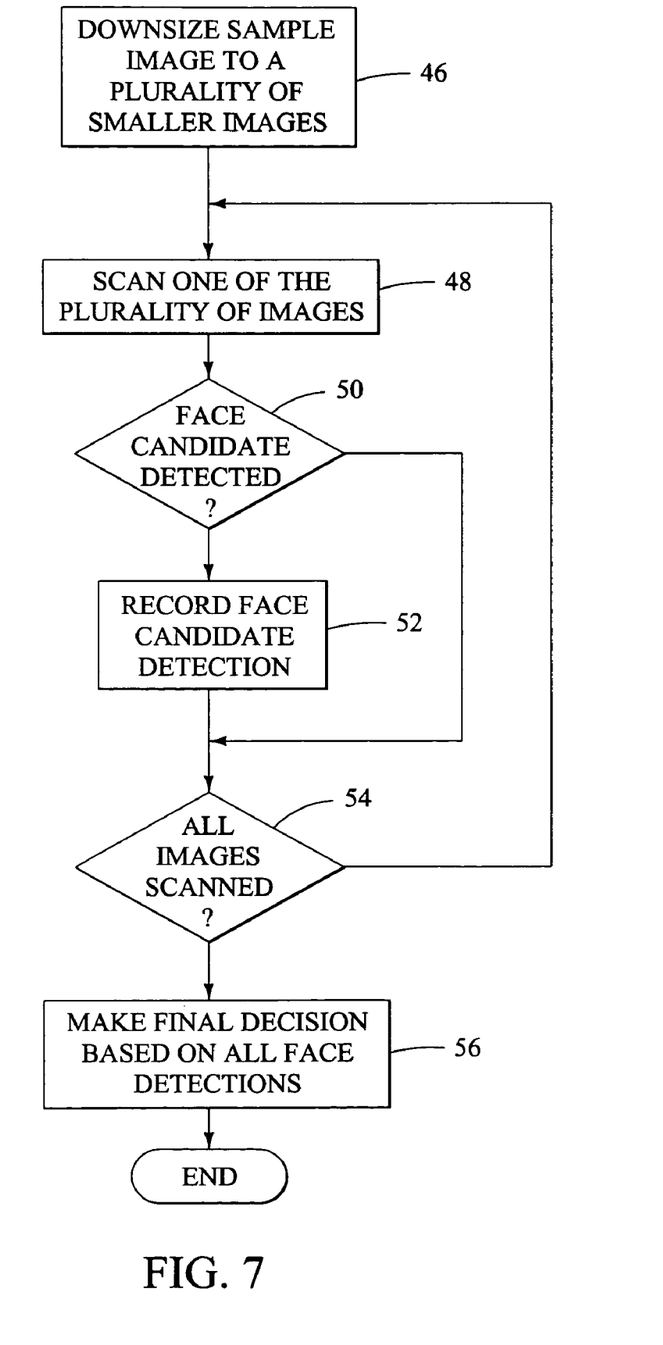
FIG. 7 is a flowchart of the process included in a testing stage of the face detection process in accordance with one embodiment of the present invention.
Figure 8:
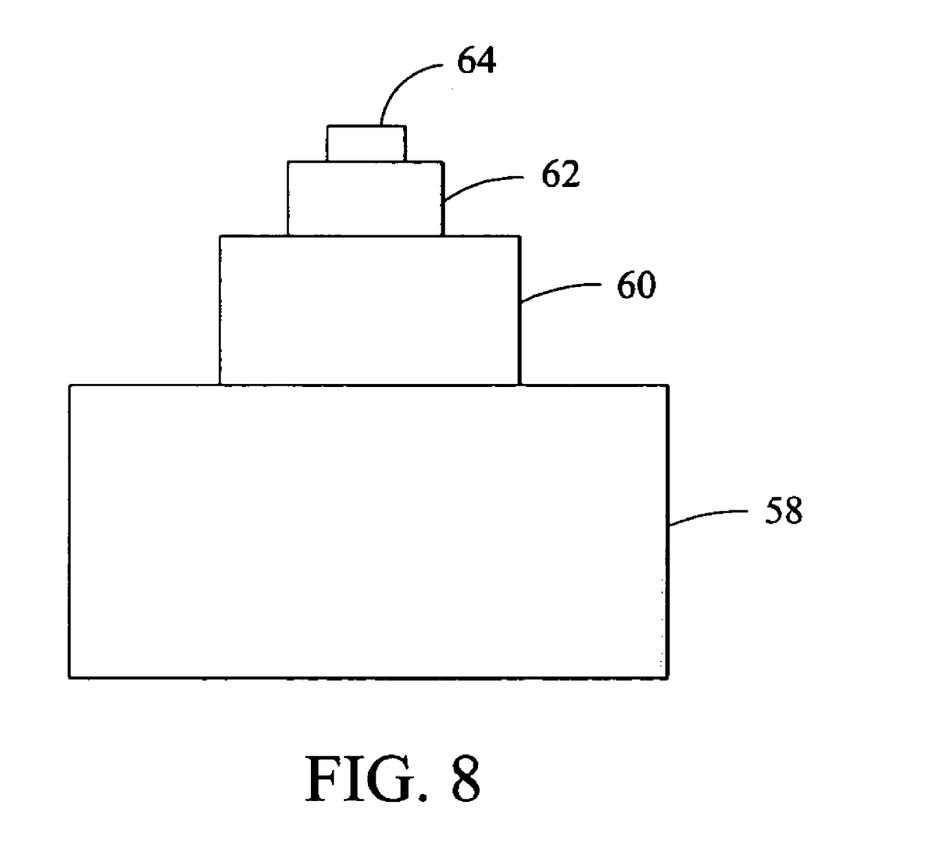
FIG. 8 is a diagram illustrating the manner in which an image to be tested is downsized.

Turning to FIG. 7, the testing stage 12 is now described in more detail. The images considered up to this point have been very small 16×14, for example. The data that is obtained in the training stage 10 is with respect to 16×14 images. However, an image in a typical photograph, for example, is much bigger. Therefore, an image to be analyzed requires downsizing to a smaller scale. For example, a photograph that is 4×8 inches might be approximately 640×480 pixels, and a face within the picture might be approximately 100×100 pixels. Therefore, the 100×100 face requires downsizing to a 16×14 image to correspond with the data obtained in the training stage 10. In accordance with one embodiment of the present invention, downsizing is performed through Gausian pyramid of images (block 46). An example of a Gausian pyramid of images is shown in FIG. 8. An image 58 that is 640×480 might be downsized initially to an image 60 that is 453×339. Then in the next stage the 453×339 image 60 might be downsized to a 320×240 image 62. In other words, the image is reduced each time by a factor of the square root of two until the image is downsized to a 16×14 image 64.

Once a plurality of smaller images have been created, each of the images 58, 60, 62, 64 are scanned one pixel at a time using a 16×14 window (block 48). If a face candidate is detected in any of the images 58, 60, 62, 64 during a scan (block 50), the detection is recorded (block 52). Then a determination is made as to whether all image sizes have been scanned (block 54). If not, the next image is scanned for a face candidate (block 48). If all images 58, 60, 62, 64 have been scanned, a final decision is made as to whether a face has in fact been detected in in the image being tested (block 56). The final decision may be made based on the number of face detections in all the image sizes. For example, three or more face detections in four different images 58, 60, 62, 64 may indicate a detection of a face.

In accordance with one embodiment of the present invention, a face candidate is detected during the scanning of each of the different sizes of the image using a log L likelihood ratio test as shown in the equation below, $$\log L(O) = \log \frac{P_F(O)}{P_N(O)} \approx \log \frac{\prod_{k=1}^{N} P_F(i_k|j_k)}{\prod_{k=1}^{N} P_N(i_k|j_k)} \quad (2)$$

$$= \sum_{k=1}^{N} [\log P_F(i_k|j_k) - \log P_N(i_k|j_k)] > \lambda$$

where P: probability; F: Face class; N: Non-Face class; i, j: position index; N: number of pairs of pixels that are selected in the training stage; and $\lambda$: threshold.

Based on the positions given by the N pairs of pixels corresponding to the best N distance (D) values, the pixel values at these positions in a test image are plugged into the stored histograms corresponding to each of the N pairs to calculate the probabilities of observation, i.e., $P_F(i_k|j_k)$ and $P_N(i_k|j_k)$ of equation (2). Then the log L likelihood is calculated and compared with the threshold $\lambda$. A face is determined to be detected if the log L likelihood is greater than the threshold $\lambda$. The value of the threshold $\lambda$ is obtained by adjusting an initial value based on a number of log L likelihood calculations obtained and the desired level of accuracy of detection.

While a specific embodiment of the present invention has been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for detecting an object in an image comprising:
   calculating, using a processor, a log L likelihood of pairs of pixels at select positions in the image, said select positions being derived from a plurality of first training images and a plurality of second training images;
   comparing, using a processor, said calculated log L likelihood of said pairs of pixels with a threshold value; and
   determining, using a processor, that the object has been detected when said calculated log L likelihood is greater than said threshold value;
   wherein said deriving of said select positions in the image includes,
   calculating pair-wise conditional distributions corresponding to the plurality of said first training images having a predetermined dimension and sample objects and said plurality of second training images having said predetermined dimension and sample non-objects;
   calculating conditional relative entropy values between all pairs of pixels in said first and second training images based on said pair-wise conditional distributions; and
   selecting a plurality of the largest conditional relative entropy values and corresponding pairs of pixels from said conditional relative entropy values calculated for said all pairs of pixels; and
   wherein said select positions correspond to said selected pairs of pixels from said conditional relative entropy values calculated for said all pairs of pixels.

2. The method as defined in claim 1, wherein the object comprises a face, said plurality of first training images comprises sample faces, and said plurality of second training images comprise sample non-faces.

3. The method as defined in claim 1, wherein said pair-wise conditional distributions comprise histograms, said histograms corresponding to said first training images being created based on a probability and an intensity of a pixel in said first training images given an intensity value at another pixel in said first training images, and said histograms corresponding to said plurality of second training images being created based on pairs of pixels used in creating said histogram corresponding to said first training images.

4. The method as defined in claim 1 wherein said conditional relative entropy values are calculated using a Kullback-Leibler distance (D), $$D(P_F(i|j)\|P_N(i|j)) \sum_{I(i)=1}^{M} P_F(j) \sum_{I(j)=1}^{M} P_F(i|j) \log \frac{P_F(i|j)}{P_N(i|j)}$$

where D: distance; P: probability; F: object class; N: non-object class; i, j: position index; I(i), I(j): pixel intensity at position i, j; and M: the number of different intensity values a pixel can take, and wherein D(i, j) is non-negative and (Di, j) =0 if and only if the two conditional probabilities functions $P_F(i|j)$, $P_N(i|j)$ are the same.

5. The method as defined in claim 4, wherein said conditional relative entropy values are selected from larger (D) values calculated.

6. The method as defined in claim 1 further comprising:
   creating a distance image representing the results of said calculation of said conditional relative entropy values for all pairs of pixel in said first and second training images.

7. The method as defined in claim 6, wherein said distance image comprises rows and columns of points the size of a product of a width and a length of said predetermined dimension, wherein said points having large conditional relative entropy values are brighter than the points that have small conditional relative entropy values.

8. The method as defined in claim 7 wherein each row of points in said distance image is transformed into a block having said predetermined dimension of said first and second training images, and said blocks are formed to create a transformed image having said predetermined dimension.

9. The method as defined in claim 8, wherein said log L likelihood is calculated for pairs of pixels in a test image corresponding to selected locations on said transformed image.

10. The method as claimed in claim 1 further comprising:
    reducing the test image into a plurality of second test images, and calculating said log L likelihood with respect to pixels in each of said plurality of second test images,
    wherein the object is determined to be detected in the test image when said calculated log L likelihood of at least one of said second test images is greater than said threshold value.

11. The method as defined in claim 1 wherein said comparison of said log L likelihood with said threshold value is defined by an equation, $$\log L(O) = \log \frac{P_F(O)}{P_N(O)} \approx \log \frac{\prod_{k=1}^{N} P_F(i_k|j_k)}{\prod_{k=1}^{N} P_N(i_k|j_k)}$$

$$= \sum_{k=1}^{N} [\log P_F(i_k|j_k) - \log P_N(i_k|j_k)] > \lambda$$

where P: probability; F: object class; N: non-object class; i, j: position index; N: number of said pairs of pixels corresponding to said desired conditional relative entropy selected; and λ: threshold.

12. The method as defined in claim 1, wherein said sample objects in said plurality of first images are uniformly aligned at substantially the same predetermined positions.

13. A method for detecting a face in an image, comprising:
calculating, using a processor, a log L likelihood of pairs of pixels at select positions in the image, said select positions being derived from a plurality of first training images and a plurality of second training images;
comparing, using a processor, said calculated log L likelihood of said pairs of pixels with a threshold value; and
determining, using a processor, that the face has been detected when said calculated log L likelihood is greater than said threshold value;
wherein said deriving of said select positions in the image includes,
calculating histograms corresponding to a plurality of training face images having a predetermined dimension and a plurality of training non-face images having said predetermined dimension, said histograms being defined by probability and intensity of pixels in said training face and non-face images;
calculating Kullback-Leibler distances (D) between all pairs of pixels in said training face images and said training non-face images based on said histograms; and
selecting a plurality of largest Kullback-Leibler distance (D) values and corresponding pairs of pixels from said Kullback-Leibler distances (D) calculated for all said pairs of pixels; and
wherein said select positions correspond to said selected pairs of pixels from Kullback-Leibler distance values calculated for said all pairs of pixels.

14. The method as defined in claim 13, wherein said histograms corresponding to said training face images are created based on a probability and an intensity of a pixel on said training face image given an intensity value of another pixel on said training face image, and said histograms corresponding to said training non-face images are created based on pairs of pixel used in creating said histograms corresponding to said training face images.

15. The method as defined in claim 13, wherein said Kuilback-Leibler distance (D) is defined by an equation, $$D(P_F(i|j)\|P_N(i|j)) \sum_{I(i)=1}^{M} P_F(j) \sum_{I(j)=1}^{M} P_F(i|j) \log \frac{P_F(i|j)}{P_N(i|j)}$$

where, D: distance; P: probability; F: object class; N: non-object class; i, j: position index; I(i), I(j): pixel intensity at position i, j; and M: the number of different intensity values a pixel can take, and wherein D(i, j) is non-negative and (Di, j) =0 if and only if the two conditional probabilities functions $P_f(i|j)$, $P_N(i|j)$ are the same.

16. The method as defined in claim 13 wherein said comparison of said log L likelihood with said threshold value is defined by an equation $$\log L(O) = \log \frac{P_F(O)}{P_N(O)} \approx \log \frac{\prod_{k=1}^{N} P_F(i_k|j_k)}{\prod_{k=1}^{N} P_N(i_k|j_k)}$$

$$= \sum_{k=1}^{N} [\log P_F(i_k|j_k) - \log P_N(i_k|j_k)] > \lambda$$

Where, P: probability; F: face class; N: non-face class; i, j: position index; N: number of pairs of pixels corresponding to said desired Kullback-Leibler distance (D) selected in the training stage; and λ: threshold.

17. A method for detecting a face in an image, comprising:
calculating, using a processor, a log L likelihood of pairs of pixels at select positions in the image, said select positions being derived from a plurality of first training images and a plurality of second training images;
comparing, using a processor, said calculated log L likelihood of said pairs of pixels with a threshold value;
determining, using a processor, that the face has been detected when said calculated log L likelihood is greater than said threshold value; and
reducing a test image into a plurality of smaller test images, and calculating said log L likelihood with respect to pixels in each of said plurality of smaller test images;
wherein the face is determined to be detected in the test image when said calculated log L likelihood of at least one of said smaller test images is greater than said threshold value.

* * * * *

UNITED STATES PATENT AND TRADEMARK OFFICE
CERTIFICATE OF CORRECTION

PATENT NO. : 7,548,637 B2
APPLICATION NO. : 11/101376
DATED : June 16, 2009
INVENTOR(S) : Xiong et al.

It is certified that error appears in the above-identified patent and that said Letters Patent is hereby corrected as shown below:

In the Claims:

Col. 6, Line 19
Claim 4

Please delete the equation:

" $D(P_F(i|j) \| P_N(i|j)) \sum\limits_{I(i)=1}^{M} P_F(j) \sum\limits_{J(j)=1}^{M} P_F(i|j) \log \dfrac{P_F(i|j)}{P_N(i|j)}$ "

and insert in its place:

-- $D(P_F(i|j) \| P_N(i|j)) = \sum\limits_{J(i)=1}^{M} P_F(j) \sum\limits_{I(j)=1}^{M} P_F(i|j) \log \dfrac{P_F(i|j)}{P_N(i|j)}$ --

Col. 8, Lines 1-2
Claim 15

Please delete hyphenated word "Kuilback-Leibler" and insert -- Kullback-Leibler -- in its place.

Col. 8, Line 5
Claim 15

Please delete the equation:

" $D(P_F(i|j) \| P_N(i|j)) \sum\limits_{I(i)=1}^{M} P_F(j) \sum\limits_{I(j)=1}^{M} P_F(i|j) \log \dfrac{P_F(i|j)}{P_N(i|j)}$ "

and insert in its place:

-- $D(P_F(i|j) \| P_N(i|j)) = \sum\limits_{I(i)=1}^{M} P_F(j) \sum\limits_{I(j)=1}^{M} P_F(i|j) \log \dfrac{P_F(i|j)}{P_N(i|j)}$ --

UNITED STATES PATENT AND TRADEMARK OFFICE
CERTIFICATE OF CORRECTION

PATENT NO. : 7,548,637 B2
APPLICATION NO. : 11/101376
DATED : June 16, 2009
INVENTOR(S) : Xiong et al.

It is certified that error appears in the above-identified patent and that said Letters Patent is hereby corrected as shown below:

<u>In the Claims</u>:

Col. 8, Line 15   Please delete the equation:
Claim 15          "$P_f(i|j), P_N(i|j)$"
                  and insert in its place:
                  -- $P_F(i|j), P_N(i|j)$ --

Signed and Sealed this

Sixth Day of October, 2009

David J. Kappos
*Director of the United States Patent and Trademark Office*